June 21, 1955 C. W. CRENSHAW 2,711,036
BLADE ASSEMBLY FOR ATTACHMENT TO TRACTORS
Filed Feb. 26, 1951 2 Sheets-Sheet 1
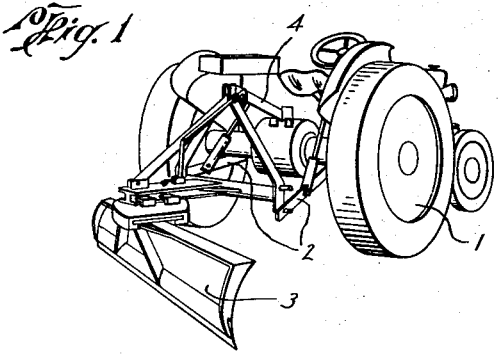
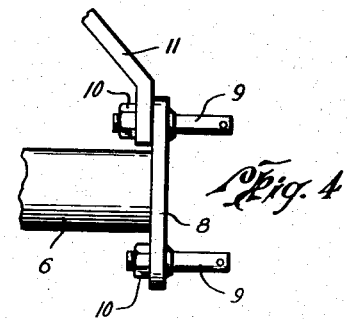
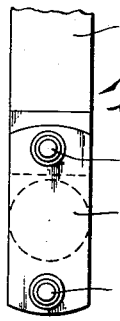
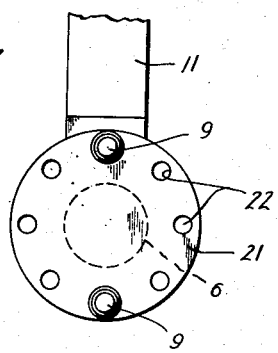
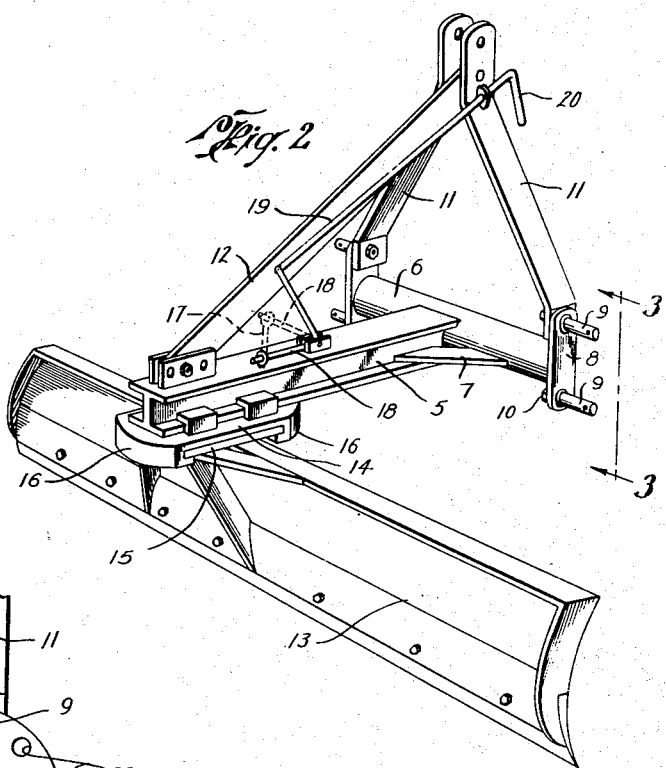
Clarence W. Crenshaw
INVENTOR.
BY
ATTORNEY June 21, 1955  C. W. CRENSHAW  2,711,036
BLADE ASSEMBLY FOR ATTACHMENT TO TRACTORS
Filed Feb. 26, 1951  2 Sheets-Sheet 2
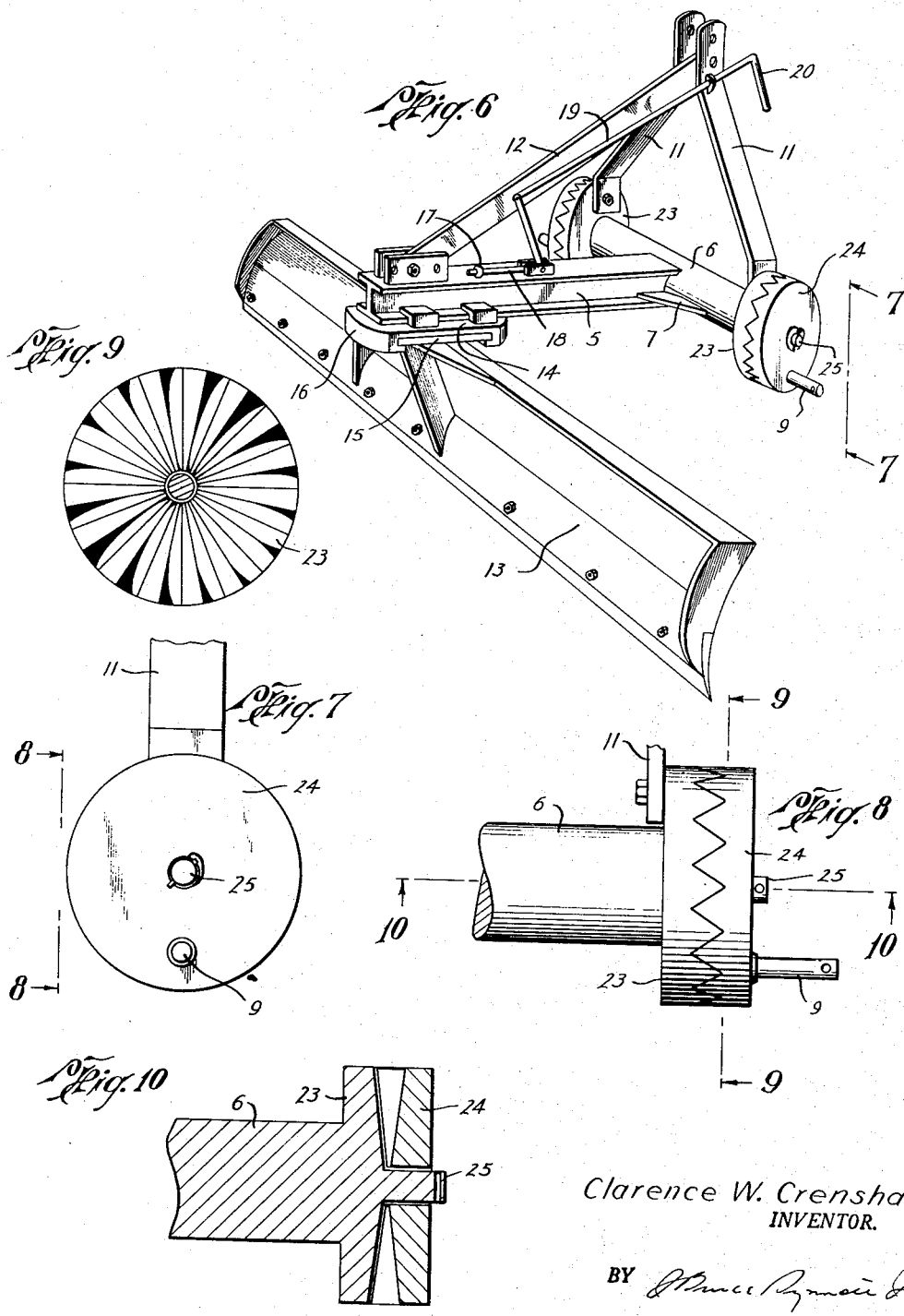
Clarence W. Crenshaw
INVENTOR.
BY
ATTORNEY

United States Patent Office 2,711,036
Patented June 21, 1955

2,711,036

BLADE ASSEMBLY FOR ATTACHMENT TO TRACTORS

Clarence W. Crenshaw, Beaumont, Tex.

Application February 26, 1951, Serial No. 212,745

1 Claim. (Cl. 37—159)

The invention concerns a blade assembly for attachment to tractors, for use in grading, terracing and ditching operations. It concerns more particularly a novel arrangement for connecting the frame of the blade assembly to the tractor drawbars whereby the blade assembly may be selectively mounted on the tractor at any desired angle.

It is an object of the invention to provide means for selectively connecting the frame of the blade assembly to the tractor drawbars at any desired angle with respect to the horizontal plane, whereby the ends of the blade may be substantially raised or lowered with respect to each other.

Another object of the invention is to provide means for selectively connecting the frame of the blade assembly to the tractor drawbars at any desired angle with respect to the center line of the tractor, whereby the blade may be moved laterally with respect to the center of the tractor.

The invention is intended more particularly for use in conjunction with tractors of the type having a pair of rearwardly extending, hydraulically lifted drawbars for use in attaching various implements to the tractor. Such implements usually include a frame having connecting pins extending outwardly from the sides thereof for engagement by the tractor drawbars. The implements are additionally supported at a third point, above and between the tractor drawbars, by a link connected to the frame of the tractor. Tractors of the type described ordinarily are equipped with means for raising and lowering the drawbars with respect to each other whereby they may be maintained in the same horizontal plane. The amount of such vertical adjustment is usually limited, and is not sufficient to accomplish the purposes of this invention.

It is common practice to attach blade assemblies to tractors in the manner described. Such blade assemblies ordinarily include a frame having a single connecting pin extending outwardly from each side thereof for engagement by the tractor drawbars. Thus the position of the blade assembly with respect to the tractor drawbars is fixed. The blade assembly usually has means for adjusting the pitch of the blade, and the blade usually is mounted on a turntable whereby it may be set at any desired angle with respect to the center line of the tractor. In some cases the blade may be moved laterally with respect to the center line of the tractor by adjusting its position with respect to the frame.

An advantageous feature of the invention is that it enables the blade to be maintained in horizontal position, or alternatively, either end of the blade may be raised or lowered substantially with respect to the other, by a simple adjustment of the pins connecting the frame to the tractor drawbars. Such adjustment may be accomplished in a fraction of a minute.

Another advantageous feature of the invention is that it permits the frame of the blade assembly to be maintained in alignment with the center line of the tractor, or alternatively, the frame of the blade assembly may be positioned at any desired angle with respect to the center line of the tractor, by a simple adjustment of the pins connecting the frame to the tractor drawbars. This arrangement permits the blade to be moved laterally with respect to the center of the tractor.

By permitting the ends of the blade to be substantially raised or lowered with respect to each other, the novel connecting means of the invention enables the blade to accomplish an effective cutting action. No preliminary plowing of the earth is required in order to perform grading, terracing and ditching operations. The blade may be set at the desired angle independently of the fact that the wheels of the tractor may or may not be resting on level ground.

By permitting the blade to be moved laterally with respect to the center of the tractor, the novel connecting means of the invention enables the leading edge of the blade to be positioned nearer the center of the tractor, when grading, terracing or ditching, thus partially compensating for the side draft which results from the resistance of the earth to movement of the blade, tending to turn the tractor to one side or the other.

In one embodiment thereof the invention contemplates a blade assembly including a frame having a plurality of connecting pins extending outwardly from each side thereof for selective engagement by the tractor drawbars, the connecting pins being mounted one above the other on plates secured to the sides of the frame.

In another embodiment thereof the invention contemplates a blade assembly including a frame having one or more connecting pins extending outwardly from each side thereof for engagement by the tractor drawbars, the connecting pins being selectively mounted in openings formed in plates secured to the sides of the frame. The openings formed in the plates for engagement by the connecting pins may be arranged either one above the other or spaced about the circumference of a circle.

In another embodiment thereof the invention contemplates a blade assembly including a frame having a single connecting pin extending outwardly from each side thereof for engagement by the tractor drawbars, the connecting pins being mounted eccentrically on circular plates which are rotatably secured to the sides of the frame and may be set in any desired position with respect thereto.

The invention will be readily understood by referring to the following description and the accompanying drawing, in which:

Fig. 1 is a perspective view showing the rear end of a tractor having a blade assembly embodying the invention mounted on the tractor drawbars in operative position.

Fig. 2 is an enlarged perspective view of the blade assembly shown in Fig. 1.

Fig. 3 is an enlarged fragmentary view in elevation, taken on the line 3—3 of Fig. 2.

Fig. 4 is a view in elevation taken on the line 4—4 of Fig. 3.

Fig. 5 is a fragmentary view in elevation, similar to Fig. 3, showing another embodiment of the invention.

Fig. 6 is a perspective view of the blade assembly, similar to Fig. 2, having another embodiment of the invention incorporated therein.

Fig. 7 is an enlarged fragmentary view in elevation, taken on the line 7—7 of Fig. 6.

Fig. 8 is a view in elevation taken on the line 8—8 of Fig. 7.

Fig. 9 is a view in elevation, partly in section, taken on the line 9—9 of Fig. 8.

Fig. 10 is a sectional view taken on the line 10—10 of Fig. 8.

Referring to the embodiment of the invention shown in Figs. 1 to 4 of the drawing, a tractor 1 is provided with a pair of rearwardly extending, hydraulically lifted drawbars 2. A blade assembly embodying the invention, indicated generally by the numeral 3, is secured to the ends of the drawbars 2 and is additionally supported at a third point, above and between the drawbars 2, by a link 4 which is connected to the frame of the tractor 1.

The blade assembly 3 includes a horizontally disposed T-shaped frame comprising an I-beam 5 which is joined at one end to a transversely disposed tubular member 6, the structure being reenforced by a pair of gusset plates 7. A pair of elongated, vertically disposed plates 8 are secured to the ends of the tubular member 6, and a pair of connecting pins 9 are secured to each of the plates 8 and extend outwardly therefrom. One end of the connecting pins 9 is threaded, and the threaded ends are inserted thru openings formed in the ends of the plates 8, above and below the tubular member 6. Nuts 10 are applied to the threaded ends of the connecting pins 9. The outer ends of the connecting pins 9 are selectively engaged by the drawbars 2, and holes are provided in the outer ends of the pins 9 to receive cotter pins for retaining the drawbars 2 in engagement with the pins 9.

A pair of elongated members 11 are pivotally connected by the uppermost pins 9 to the plates 8 and extend upwardly therefrom, the upper ends of the elongated members 11 being pivotally connected to one end of the link 4. An elongated member 12 is pivotally connected at one end to the upper ends of the elongated members 11, the other end of the elongated member 12 being pivotally connected to the end of the I-beam 5 opposite the tubular member 6. The position of the adjacent end of the elongated member 12 with respect to the I-beam 5 is adjustable whereby the pitch of the blade, hereinafter referred to, may be varied.

A blade 13 is rotatably secured to the end of the I-beam 5 opposite the tubular member 6 by a turntable comprising an upper plate 14, which is rigidly secured to the I-beam 5, and a low plate 15 which is rigidly secured to the blade 13 and is rotatable with respect to the upper plate 14. A pair of arcuate members 16, which are formed integrally with the upper plate 14, extend downwardly from the ends of the upper plate 14 and are provided with inwardly extending lips which engage the under side of the lower plate 15 whereby the lower plate 15 is rotatably secured in engagement with the upper plate 14. A plurality of openings (not shown) are formed in the ends of the lower plate 15 for selective engagement by a pin 17, which also engages a corresponding opening in the upper plate 14, to lock the lower plate 15 in any desired position with respect to the upper plate 14. A lever 18, which is fulcrumed on the I-beam 5, engages the pin 17 to lift it out of engagement with the openings in the plates 14 and 15. The lever 18 is connected by a link 19 to a handle 20 which may be manipulated from the seat of the tractor 1.

The ends of the drawbars 2 may be connected, respectively, to either the upper or the lower of the connecting pins 9 whereby the entire blade assembly may be positioned at any desired angle with respect to the horizontal plane. By connecting both of the drawbars to either the upper pins or the lower ones the entire blade assembly, including the blade 13, may be disposed horizontally. Alternatively, the blade assembly, including the blade 13, may be tilted to one side or the other, and either end of the blade 13 may be substantially raised or lowered with respect to the other, by connecting one of the drawbars to an upper pin and connecting the other drawbar to a lower pin.

Referring to the embodiment of the invention shown in Fig. 5 of the drawing, circular plates 21 may be substituted for the elongated plates 8 shown in Figs. 1 to 4. A plurality of openings 22 may be spaced about the circumference of the plates 21 for engagement by the connecting pins 9, two of which are shown. The threaded ends of the pins 9 may be selectively inserted thru any of the openings 22. This arrangement not only permits the blade assembly to be selectively mounted on the tractor drawbars with the blade 13 either in horizontal position or tilted from one end to the other, as above described, but also permits the blade assembly to be mounted in any desired position with respect to the center line of the tractor. This enables the blade to be moved laterally with respect to the center of the tractor.

Referring to the embodiment of the invention shown in Figs. 6 to 10 of the drawing, a pair of circular plates 23, each having circumferentially spaced teeth on the outer surface thereof, are secured to the ends of the tubular member 6. A pair of circular plates 24, each having circumferentially spaced teeth on the inner surface thereof adapted to mesh with the teeth of the plates 23, are rotatably secured to the plates 23. Pins 25, which extend outwardly from the center of the plates 23, engage openings formed in the center of the plates 24. Openings are formed in the ends of the pins 25 to receive cotter pins for retaining the plates 24 in engagement with the plates 23. A connecting pin 9 is mounted eccentrically on each of the plates 24 and extends outwardly therefrom for engagement by one of the drawbars 2. The position of the pins 9 may be adjusted by rotating the plates 24 with respect to the plates 23. This arrangement accomplishes the same result as that shown in Fig. 3.

The invention may be modified in various ways without departing from the spirit and scope thereof.

I claim:

In combination with a tractor having a pair of rearwardly extending, hydraulically lifted drawbars, a blade assembly suspended from the ends of the drawbars and additionally supported at a third point, above and between the drawbars, by a link connected to the frame of the tractor, the blade assembly including a T-shaped frame having a transverse portion and a rearwardly extending portion, a blade carried by the rearwardly extending portion, a pair of flange-like plates each secured to one end of the transverse portion and extending outwardly therefrom, a pair of elongated members each pivotally connected to one of the plates and extending upwardly therefrom for engagement by the link, an elongated member pivotally connected at one end to the upper ends of the first mentioned elongated members and pivotally connected at its other end to the rearwardly extending portion, the position of the adjacent end of the last mentioned elongated member with respect to the rearwardly extending portion being adjustable whereby the pitch of the blade may be varied, and means pivotally connecting the frame of the blade assembly to the ends of the drawbars comprising two pairs of pins, one pair of pins being carried by each of the plates and extending outwardly therefrom for selective engagement by one of the drawbars, the pins being inserted thru openings formed in the plates adjacent their outer edges, one of the openings of each plate being positioned directly above the transverse portion of the frame and another of the openings being positioned directly below the transverse portion, one of the pins of each pair being inserted thru the first mentioned opening for engagement by one of the first mentioned elongated members whereby the elongated member is pivotally connected to the plate.

References Cited in the file of this patent
UNITED STATES PATENTS

| | | |
|---|---|---|
| 2,309,750 | Carrington | Feb. 2, 1943 |
| 2,346,757 | Horner | Apr. 18, 1944 |
| 2,347,290 | Shaeffer | Apr. 25, 1944 |
| 2,352,466 | Arps | June 27, 1944 |
| 2,437,059 | Williams | Mar. 2, 1948 |
| 2,465,641 | Gardner | Mar. 29, 1949 |
| 2,527,613 | Zagurski | Oct. 31, 1950 |
| 2,530,565 | Briscoe | Nov. 21, 1950 |
| 2,560,711 | Arps | July 17, 1951 |
| 2,562,486 | Denning | July 31, 1951 |
| 2,564,355 | Danuser | Aug. 14, 1951 |
| 2,566,547 | Bartlett | Sept. 4, 1951 |
| 2,609,742 | Love | Sept. 9, 1952 |
| 2,619,019 | Temple | Nov. 25, 1952 |